United States Patent
Arcese et al.

(10) Patent No.: US 9,612,820 B2
(45) Date of Patent: Apr. 4, 2017

(54) UPDATING SOFTWARE PRODUCTS ON VIRTUAL MACHINES WITH SOFTWARE IMAGES OF NEW LEVELS

(71) Applicant: International Business Machines Corporation, Armonk, NY (US)

(72) Inventors: Mauro Arcese, Rome (IT); Giuseppe Ciano, Rome (IT); Marco De Santis, Rome (IT); Gianluca Perreca, Rome (IT); Luigi Pichetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 60 days.

(21) Appl. No.: 14/605,186

(22) Filed: Jan. 26, 2015

(65) Prior Publication Data

US 2015/0220324 A1    Aug. 6, 2015

(30) Foreign Application Priority Data

Feb. 3, 2014  (GB) .................................. 1401756.0

(51) Int. Cl.
| | |
|---|---|
| *G06F 9/44* | (2006.01) |
| *G06F 9/445* | (2006.01) |
| *G06F 9/455* | (2006.01) |

(52) U.S. Cl.
CPC .................. *G06F 8/63* (2013.01); *G06F 8/65* (2013.01); *G06F 9/45558* (2013.01)

(58) Field of Classification Search
CPC ..... G06F 8/63; G06F 8/65; G06F 8/71; G06F 9/4558

(Continued)

(56) References Cited

U.S. PATENT DOCUMENTS

| | | |
|---|---|---|
| 2007/0294676 A1 | 12/2007 | Mellor et al. |
| 2009/0217244 A1 | 8/2009 | Bozak et al. |

(Continued)

FOREIGN PATENT DOCUMENTS

| | | |
|---|---|---|
| EP | 2212781 A2 | 8/2010 |
| GB | 2496560 A | 5/2013 |
| GB | 2507261 A | 4/2014 |

OTHER PUBLICATIONS

Anonymous, "Method and System for pushing image-based software customization in a virtual machine", IP.com Prior Art Database Technical Disclosure, IP.com No. 000216660, Apr. 12, 2012. http://null/IPCOM/000216660.

(Continued)

*Primary Examiner* — Anna Deng
(74) *Attorney, Agent, or Firm* — Peter J. Edwards

(57) ABSTRACT

A solution for updating at least one software product installed on a virtual machine, including providing a software image of at least one new virtual disk storing a new level of the software product together with new metadata including an indication of at least one new activation procedure of the new level of the software product, and replacing a current level of the software product with the new level of the software product, the current level of the software product being stored in at least one current virtual disk of the virtual machine together with current metadata including current activation information of the current level of the software product, where the replacing includes removing at least one current virtual disk from the virtual machine; adding at least one new virtual disk to the virtual machine; and running at least one new activation procedure according to the current activation information.

20 Claims, 7 Drawing Sheets

(58) Field of Classification Search
USPC .......................................................... 717/170
See application file for complete search history.

(56) References Cited

U.S. PATENT DOCUMENTS

| | | |
|---|---|---|
| 2011/0078680 A1 | 3/2011 | Lagergren et al. |
| 2012/0054731 A1* | 3/2012 | Aravamudan ............ G06F 8/63 717/170 |
| 2012/0054736 A1* | 3/2012 | Arcese ..................... G06F 8/65 717/172 |
| 2012/0081395 A1* | 4/2012 | Adi .......................... G06F 8/63 345/634 |
| 2012/0260249 A1 | 10/2012 | Peraza et al. |
| 2013/0091498 A1 | 4/2013 | Arcese et al. |
| 2013/0227089 A1 | 8/2013 | McLeod et al. |

OTHER PUBLICATIONS

IBM, "IBM Service Delivery Manager overview", Version 7.2.4 http://www-01.ibm.com/support/knowledgecenter/SSBH2C_7.2.4/com.ibm.isdm_7.2.4.doc/c_productoverview.html, Oct. 27, 2014.

GB Application GB1401756.0, entitled "Updating Software Products on Virtual Machines with Software Images of New Levels Thereof", filed on Feb. 3, 2014.

International Search Report dated Jul. 1, 2014 for International Application GB1401756.0.

* cited by examiner

UPDATING SOFTWARE PRODUCTS ON VIRTUAL MACHINES WITH SOFTWARE IMAGES OF NEW LEVELS

CROSS-REFERENCE TO RELATED APPLICATIONS

This application claims priority to United Kingdom Patent Application No. 1401756.0, filed Feb. 3, 2014, which is incorporated herein in its entirety.

BACKGROUND

The present disclosure relates to the data processing field. More specifically, this disclosure relates to the updating of software products on virtual machines.

Virtual (computing) machines are commonly used to emulate physical (computing) machines in virtualized computing environments. Particularly, the virtual machines are a key component of cloud computing environments, wherein computing resources offered as services are made available on-demand.

Each virtual machine may be deployed on a host computing machine by means of a corresponding software image. In general, a software image is a structure that encapsulates files residing on a (physical or virtual) computing machine (for example, storing its operating system and software products); in this way, the virtual machine may be deployed by simply creating and booting it from the software image. Moreover, the virtual machines may be combined into virtual appliances, each one comprising the definition of one or more virtual machines with its software images; the virtual appliance is encapsulated in a self-contained package, which may be deployed as a unit. Particularly, as described in US-A-2013/0227089 (the entire disclosure of which is herein incorporated by reference), virtual machine disk images for different cloud configurations may be built from a single generic virtual machine disk image; moreover, as described in EP-A-2212781 (the entire disclosure of which is herein incorporated by reference), a virtual machine may be created by utilizing a virtual OS disk and virtual application disks (with files in the virtual application disk that are linked to a specific file system location in the virtual OS disk).

The software products of the virtual machine (as well as its operating system) may be subject to maintenance operations during their life cycle; particularly, updates may be applied to the software products from time to time, for example, to correct bugs or to improve their operation. For this purpose, once the virtual machine has been deployed from the corresponding software image, its maintenance is generally managed with a traditional approach. For example, each software product may comprise an embedded updating tool, which is invoked periodically when the software product is launched; the updating tool downloads any update that is available online and then applies it to the software product automatically.

Moreover, different techniques specifically tailored to the virtual appliances have been proposed. For example, US-A-2013/0091498 (the entire disclosure of which is herein incorporated by reference) proposes driving the maintenance of a virtual appliance by a maintenance descriptor that lists software components to be updated to new levels; the virtual appliance is cloned, its software components (which should actually be updated according to a comparison between their discovered current levels and the new levels) are brought to the new levels, and the (updated) cloned virtual appliance replaces the current one. Moreover, US-A-2009/0217244 (the entire disclosure of which is herein incorporated by reference) proposes updating a virtual appliance by creating an updated level thereof including state information of the prior virtual appliance being updated. US-A-2012/0260249 (the entire disclosure of which is herein incorporated by reference) instead proposes a virtual appliance update mechanism that detects when an update to a corresponding workload (representing the virtual appliance after it has been deployed and it is executed) is made, and it makes automatic corresponding changes to the virtual appliance to reflect the update to the workload.

Alternatively, the management of the software products too may be based on the use of software images. For example, US-A-2011/0078680 (the entire disclosure of which is herein incorporated by reference) proposes reconfiguring a virtual server image by using information in a virtual server image patch.

Moreover, it is also possible to leverage an organization of each virtual machine into multiple virtual disks (each one emulating a physical disk). For example, the operating system, the software products and their data may be separated into different virtual disks. In this way, it is possible to provide a new virtual disk with an updated software product, stop the virtual machine, replace the corresponding virtual disk, and then re-start the virtual machine. Particularly, US-A-2012/0054736 (the entire disclosure of which is herein incorporated by reference) proposes providing a self-activating virtual disk, which comprises a unique identifier of the virtual disk, an upgrade of a software application and activation/de-activation scripts. When a virtual disk activation manager detects a new virtual disk that is attached to a virtual machine (by collecting a local list of all the virtual disks thereof), the de-activation script of the new virtual disk is copied onto a base operating system virtual disk; a software package of the new virtual disk is then installed by the corresponding activation scripts, and an entry for the new virtual disk is added to the local list. Conversely, when the virtual disk activation manager detects that a virtual disk has been removed, the corresponding de-activation script is executed; the de-activation script is then removed from the base operating system virtual disk and the corresponding entry is deleted from the local list.

However, the specific operations for updating any software product still require a substantial manual intervention (for example, to remove a current level of the software product, to replace it with a new level thereof and to activate the new level of the software product), which may be time consuming and prone to errors.

SUMMARY

A simplified summary of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

In general terms, the present disclosure is based on the idea of updating a software product with a corresponding software image.

Particularly, an aspect provides a method for updating at least one software product installed on a virtual machine, wherein a software image is provided of at least one new virtual disk storing a new level of the software product together with new metadata (comprising an indication of at least one new activation procedure thereof); a current level of the software product (stored in at least one current virtual disk of the virtual machine together with current metadata comprising current activation information thereof) is replaced with the new level of the software product by running said at least one new activation procedure according to the current activation information.

A further aspect provides a computer program for implementing the method (and a corresponding computer program product).

A further aspect provides a corresponding system.

More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

BRIEF DESCRIPTION OF THE SEVERAL VIEWS OF THE DRAWINGS

The solution of the present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation). Particularly.

DETAILED DESCRIPTION

Figure 1:
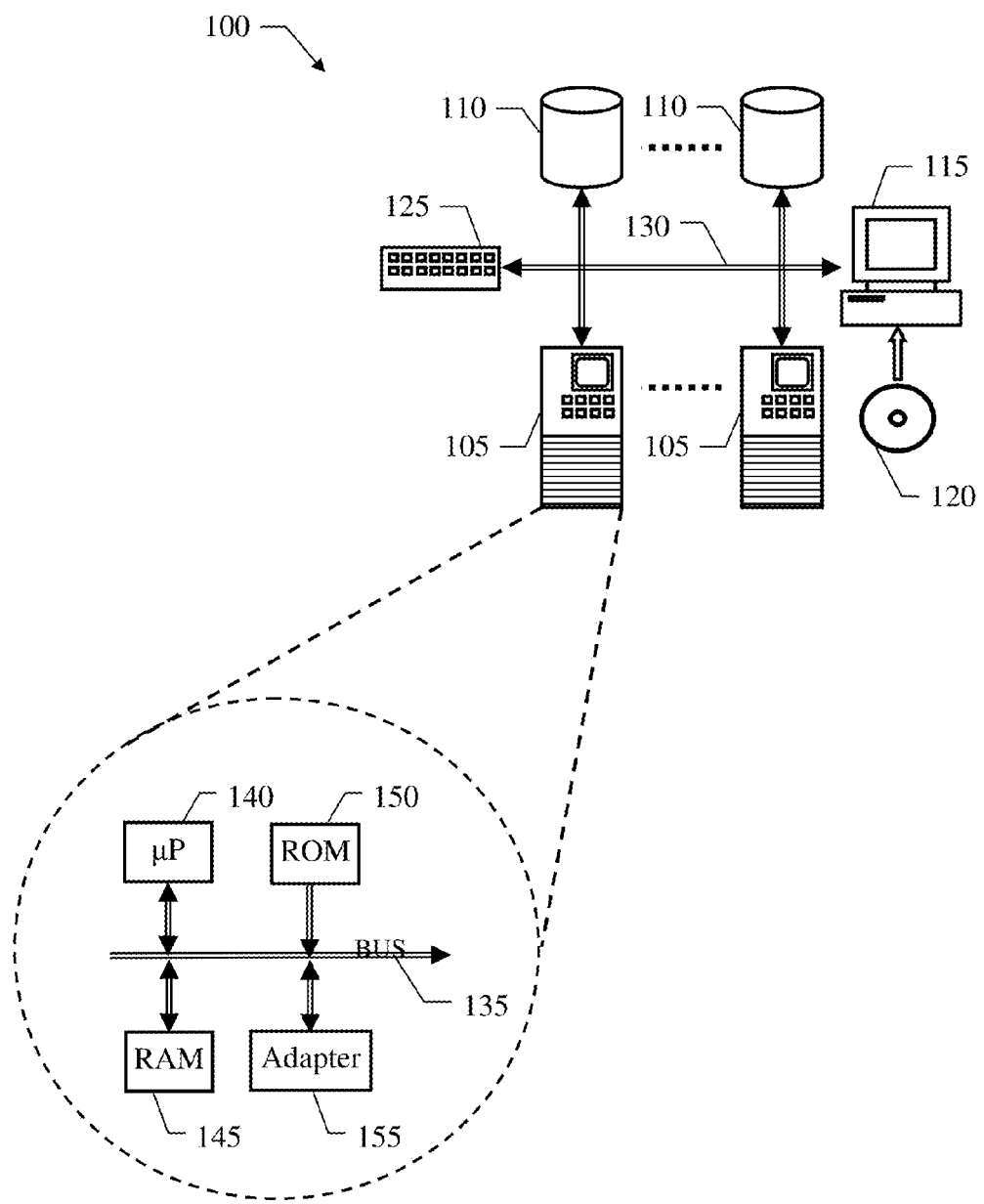
FIG. 1 shows a schematic block-diagram of a computing system wherein the solution according to an embodiment of the present disclosure may be applied.

With reference in particular to the FIG. 1, a schematic block-diagram is shown of a computing system 100 wherein the solution according to an embodiment of the present disclosure may be applied.

The computing system 100 comprises several server computing machines, or simply servers, 105 (for example, of the rack or blade type), and several storage disks 110 (for example, of the RAID type) implementing mass-memories of the servers 105; the computing system 100 also comprises a console 115 for controlling the servers 105 and the disks 110 (for example, a personal computer, also provided with a drive for reading removable storage devices, such as DVDs 120). A switch/router sub-system 125 manages any communications among the servers 105, the disks 110 and the console 115, and with a communication network, not shown in the figure (for example, the Internet or a LAN); for this purpose, the servers 105, the disks 110 and the console 115 are connected to the switch/router sub-system 125 through a cabling sub-system 130. For example, the computing system 100 may implement a cloud node of a cloud computing environment, wherein (virtual) cloud resources are made available on-demand as cloud services according to different service models, such as Infrastructure as a Service (IaaS), Platform as a Service (PaaS), Software As a Service (SAS) or Network as a service (NaaS), and/or according to different deployment models, such as public cloud, private cloud, community cloud or hybrid cloud. Several users may access the cloud computing environment by connecting thereto with corresponding client computing machines (not shown) through the communication network (i.e., the Internet in a public/community cloud or a LAN in a private cloud), so as to have the sole control of their cloud resources (which may then be used exactly as if they were dedicated physical resources).

Each server 105 is formed by several units that are connected in parallel to a bus structure 135. In detail, one or more microprocessors ($\mu$P) 140 control operation of the server 105; a RAM 145 is directly used as a working memory by the microprocessors 140, and a ROM 150 stores basic code for a bootstrap of the server 105. Moreover, the server 105 comprises a network adapter 155, which is used to connect the server 105 to the cabling sub-system 130.

Figure 2A:
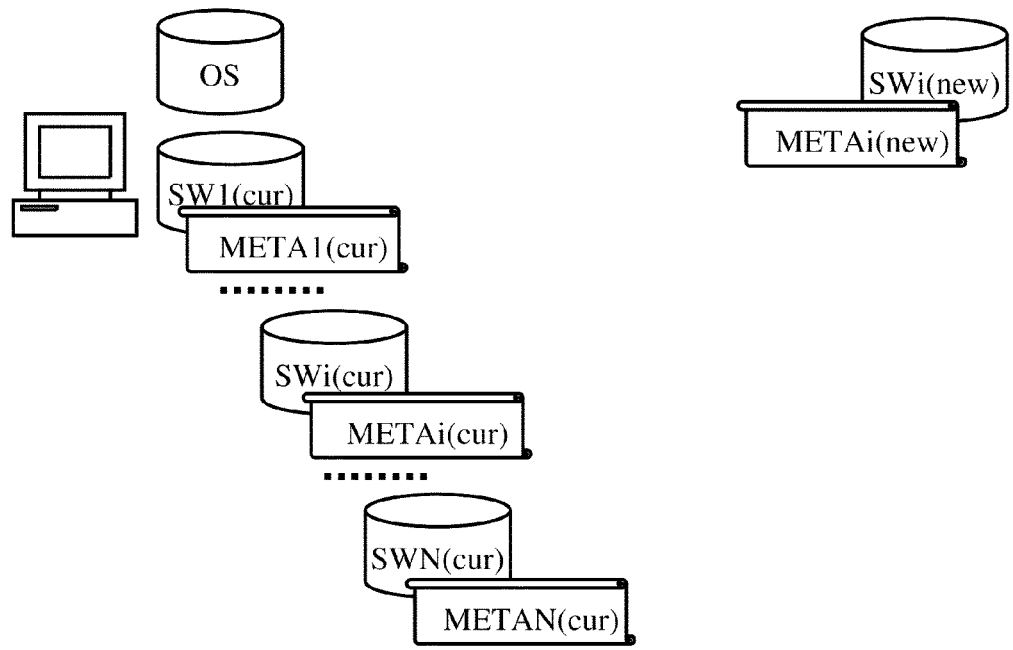
FIG. 2A-FIG. 2C show a pictorial representation of an exemplary application of the solution according to an embodiment of the present disclosure.
Figure 2B:
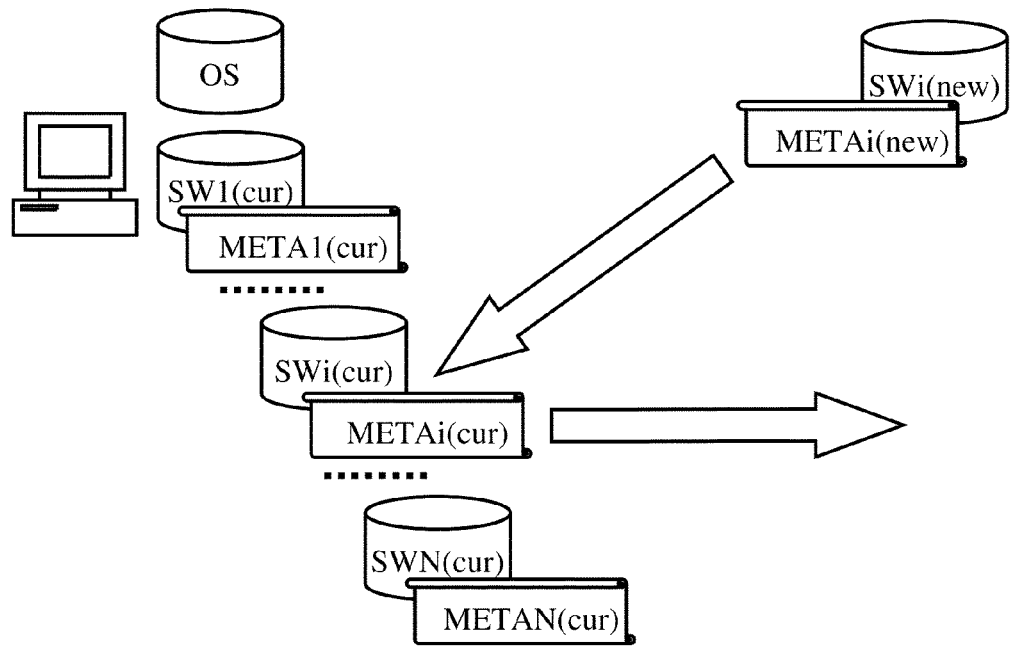
Figure 2C:
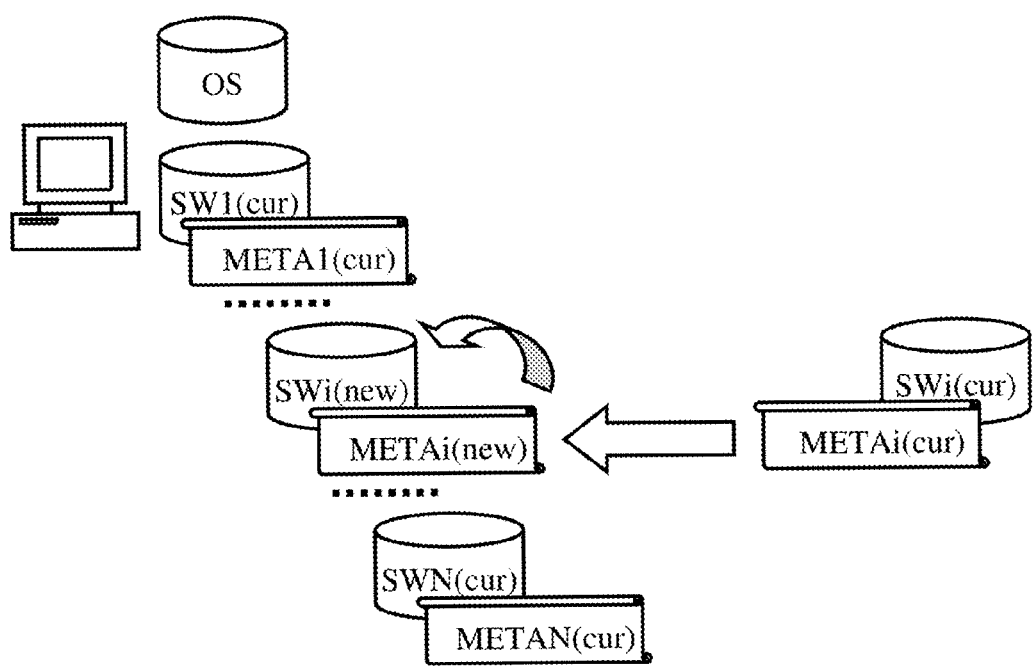

With reference now to the FIG. 2A-FIG. 2C, a pictorial representation is shown of an exemplary application of the solution according to an embodiment of the present disclosure.

Starting from the FIG. 2A, a solution allows updating one or more software products that are installed on a generic virtual machine (hosted on a server of the above-described computing system provided with an emulation layer). The virtual machine comprises an operating system OS and one or more software products SWi (with i=1 . . . N). A current level of each software product, denoted with SWi(cur), is stored in a corresponding current virtual disk, or more, together with current metadata METAi(cur) of the current level of the software product SWi(cur); the current metadata METAi(cur) comprises current activation information of the current level of the software product SWi(cur) (for example, indicating a current configuration of its programs and a current format of its data).

A software image is provided of a new virtual disk, or more, for a generic software product SWi; the software image is a physical file that defines the whole new virtual disk (for example, in the VMDK format). The new virtual disk stores a new level of the software product, denoted with SWi(new), together with new metadata METAi(new) of the new level of the software product SWi(new); the new metadata METAi(new) comprises an indication of one or more new activation procedures (for example, for configuring its programs and for migrating its data).

Moving to the FIG. 2B, the current level of the software product SWi(cur) is replaced with the new level of the same software product SWi(new). For this purpose, the current virtual disk of the current level of the software product SWi(cur) is removed from the virtual machine. The new virtual disk of the new level of the software product SWi (new) is then added to the virtual machine.

Moving to the FIG. 2C, the new activation procedures of the new metadata METAi(new) are run according to the current activation information of the current metadata METAi(cur) (for example, for configuring the programs of the new level of the software product SWi(new) like the current level of the software product SWi(cur), and for migrating the data of the current level of the software product SWi(cur) for its use by the new level of the software product SWi(new)).

The above-described solution avoids (or at least substantially reduces) any manual intervention for updating the software product. This significantly decreases the time required to perform the corresponding operations and the possibility of any errors.

Figure 3:
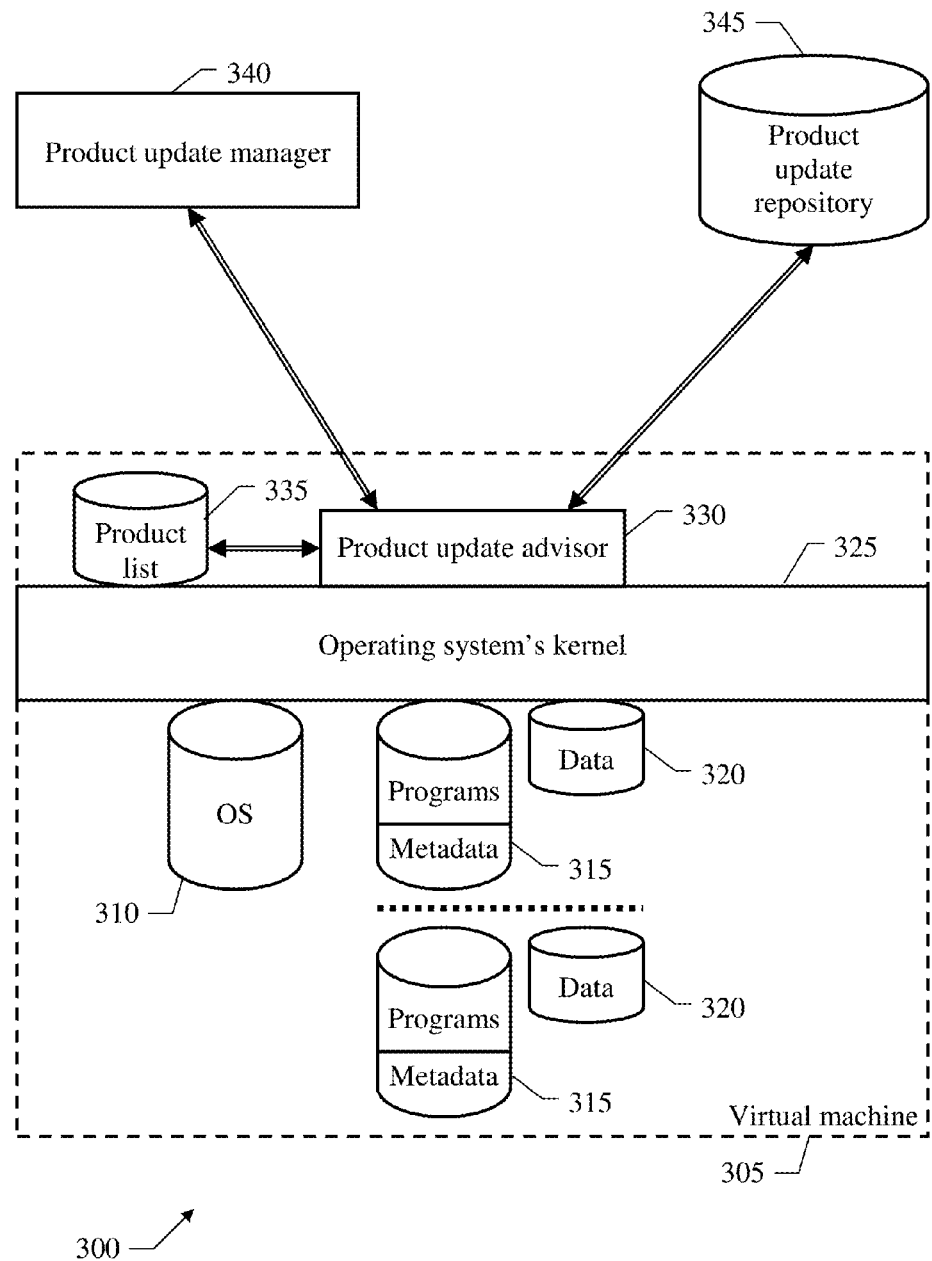
FIG. 3 shows the main software components that may be used to implement the solution according to an embodiment of the present disclosure.

With reference now to the FIG. 3, the main software components are shown that may be used to implement various solutions according to an embodiment of the present disclosure.

Particularly, all the software components (programs and data) are denoted as a whole with the reference 300. The software components are typically stored in the mass memory and loaded (at least partially) into the working memory when the programs are running. The programs are initially installed into the mass memory, for example, from removable storage units or from the communication network. In this respect, each software component may represent a module, segment or portion of code, which comprises one or more executable instructions for implementing the specified logical function.

A generic virtual machine, denoted with the reference 305, comprises a virtual disk 310 (or more) storing its operating system. The virtual machine 305 further comprises, for each software product that is installed thereon, a (program) virtual disk 315 (or more) and a (data) virtual disk 320 (or more). The virtual disk 315 stores one or more programs of the software product (for example, its executable files) and metadata thereof (for example, one or more XML files), whereas the virtual disk 320 stores data of the software product (for example, a database). Particularly, the metadata comprises a product identifier that univocally identifies the software product (for example, by the name of a vendor thereof and the name of the software product), and a level identifier that univocally identifies the level of the software product (for example, by its version, release and service pack). Moreover, the metadata comprises an indication of a stop command and of a start command that are used to start and to stop, respectively, the software product. The metadata also comprises activation information of the software product; for example, the activation information comprises program information indicating a configuration of the software product (such as port numbers used by the software product, host names/IP addresses of other virtual machines accessed by the software product) and data information indicating a format of its data (for example, a database schema). The metadata further comprises one or more activation procedures (for example, scripts); particularly, the activation procedures comprise one or more configuration procedures (for configuring the software product) and/or one or more migration procedures (for migrating the data of the software product). In addition, the metadata comprises an indication of an update policy of the software product (for example, whether the software product may be updated automatically or only upon confirmation). The metadata also comprises an indication of one or more constraints (for example, license conditions) whose compliance is required for the installation of the software product.

In operation, a kernel of the operating system (denoted with the reference 325) is loaded from the virtual disk 310 into the working memory of the virtual machine 305. A product update advisor 330 is further loaded into the working memory of the virtual machine 305 (for example, from the virtual disk 310 as well); the product update advisor 330 controls the update of the software products installed on the virtual machine 305. For this purpose, the product update advisor 330 maintains a product list 335; for each software product that is installed on the virtual machine 305, the product list stores its product identifier and level identifier. Moreover, the product update advisor 330 accesses a (remote) product update manager 340 (for example, hosted on another dedicated virtual machine of the computing system); the product update manager 340 controls the deployment of any software products on all the servers of the computing system. The product update advisor 330 further accesses a (remote) product update repository 345 (for example, hosted on another dedicated virtual machine of the computing system); the product update repository 345 stores the virtual disks of all the available software products.

Figure 4A:
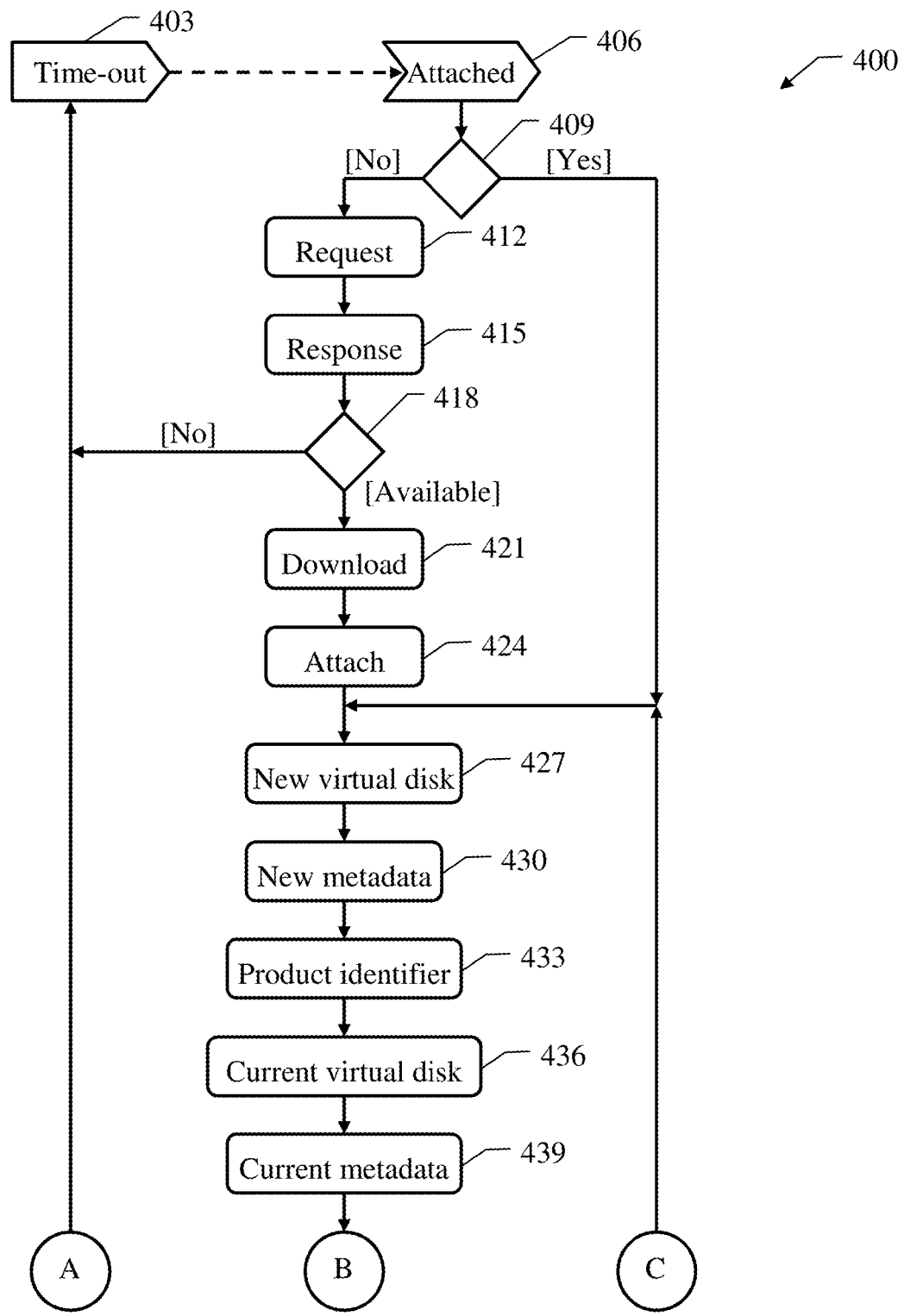
FIG. 4A-FIG. 4C show an activity diagram describing the flow of activities relating to an implementation of the solution according to an embodiment of the present disclosure.
Figure 4B:
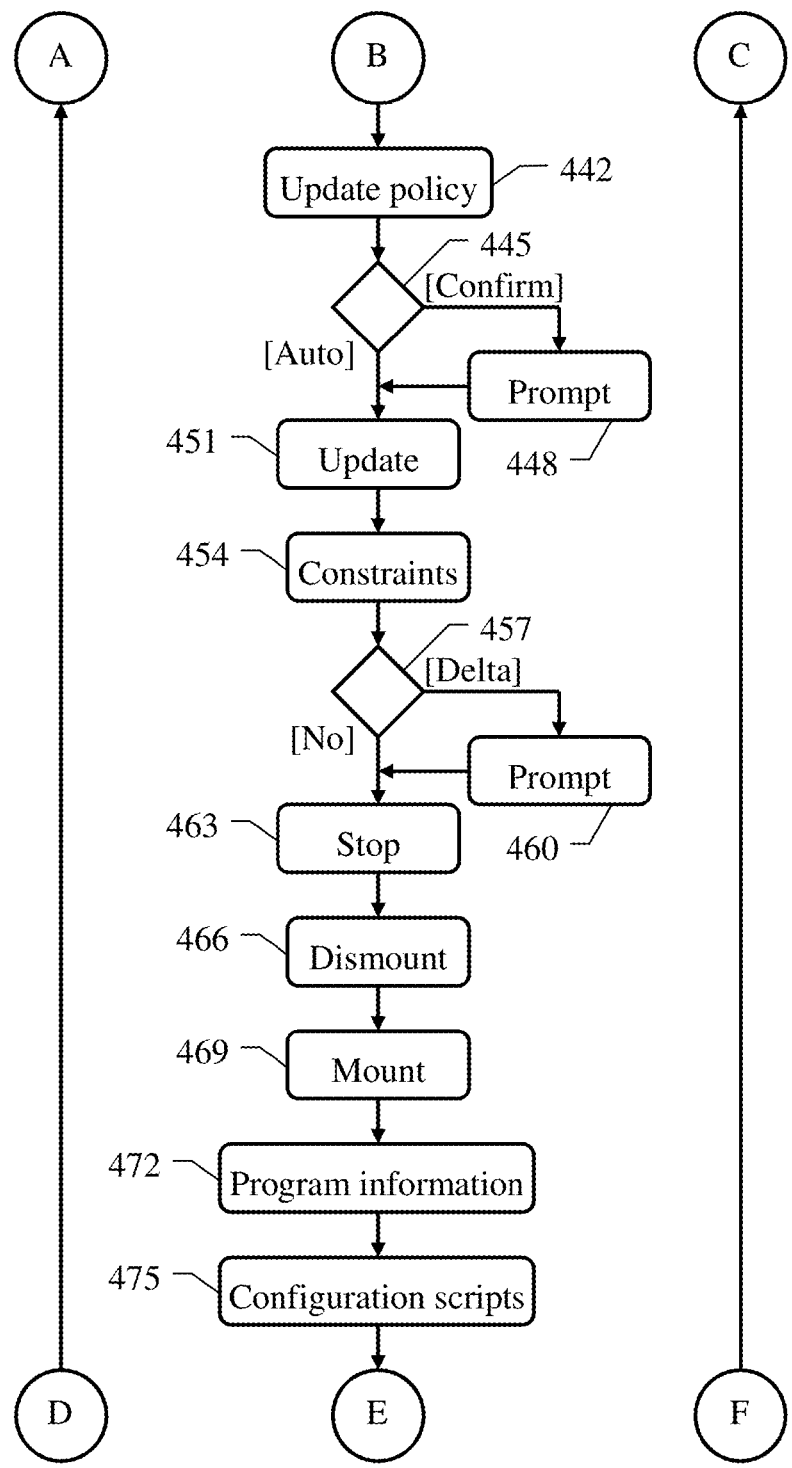
Figure 4C:
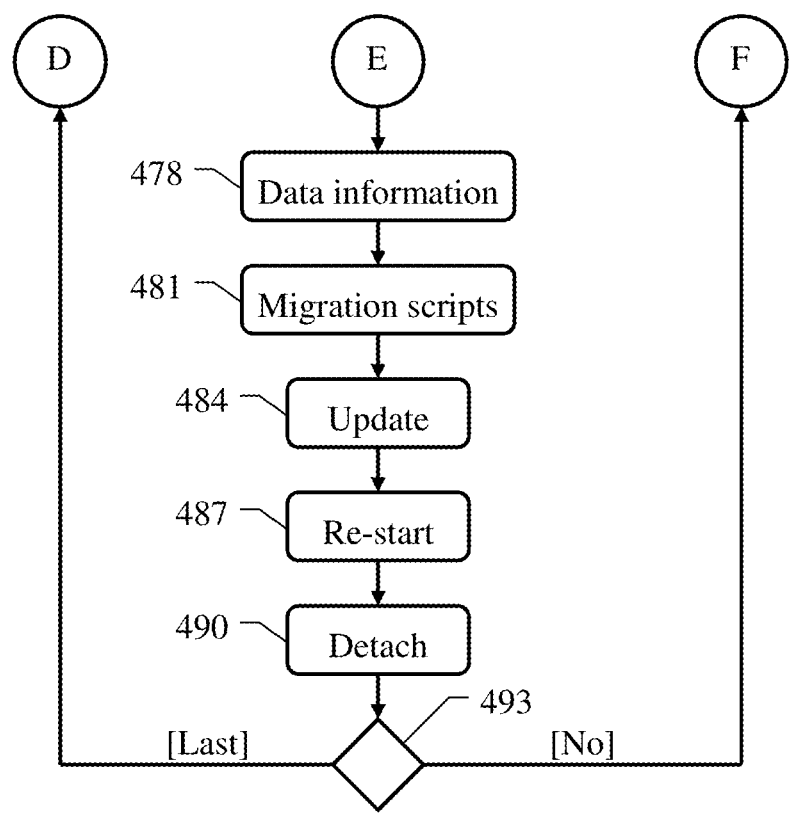

With reference now to the FIG. 4A-FIG. 4C, an activity diagram is shown describing the flow of activities relating to an implementation of the solution according to an embodiment of the present disclosure.

Particularly, the diagram represents an exemplary process that is executed by the product update advisor (to control the update of the software products installed on the corresponding virtual machine) with a method 400. In this respect, each block may represent one or more executable instructions for implementing the specified logical function on the virtual machine.

The product update advisor (for example, running in the background as an agent) continually executes a loop starting from block 403. As soon as a time-out expires (for example, every 1-5 seconds), the process passes to block 406; in this phase, any new virtual disk that has been attached to the virtual machine (since a previous execution of the loop) is detected (for example, by verifying whether the product identifier and the level identifier indicated in the metadata of each virtual disk of the virtual machine are comprised in the product list). The flow of activity branches at block 409 according to a result of this operation. If no new virtual disk has been detected, any publication is verified of a new level of each software product that is installed on the virtual machine; for this purpose, a corresponding request is submitted at block 412 to the product update manager by passing the product list indicating these software products (product identifiers) and their current levels (level identifiers). Continuing to block 415, a corresponding response is received from the product update manager, comprising the product identifier and the level identifier of the new level of any software product whose (earlier) current level is installed on the virtual machine. The flow of activity further branches at block 418 according to a result of this operation. If the new level of no software product is available, the process returns to the block 403 waiting for a next expiry of the time-out. Conversely, when the new level of one or more software products is available, each corresponding new virtual disk is downloaded at block 421 from the product update repository (by passing their product identifier and level identifier). Continuing to block 424, each new virtual disk is attached to the virtual machine. The process then proceed to lock 427; the same point is also reached directly from the block 409 when one or more new virtual disks have been detected.

In this phase, a loop is performed for processing the new virtual disk (or more) of the new level of each software product (starting from the first one). Passing to block 430, the new metadata is read from the new virtual disk. The product identifier (of the new level of the software product) is extracted from the new metadata at block 433. The corresponding current virtual disk storing the current level of the same software product (i.e., whose metadata comprises the same product identifier) is identified at block 436. Continuing to block 439, the rest of the current metadata is read from the current virtual disk.

With reference now to block 442, an indication of a current update policy (if any) is extracted from the current metadata and an indication of a new update policy (if any) is extracted from the new metadata; for example, the (current/new) update policies may indicate that the update of the software product (from the current level to the new level) is performed automatically or only upon a manual confirmation by a system administrator. A delta update policy is determined according to a comparison between the current update policy and the new update policy; for example, the delta update policy may be set equal to the current update policy if available, or equal to the new update policy otherwise. The flow of activity branches at block 445 according to the delta update policy. Particularly, if the delta update policy indicates that the update of the software product requires a manual confirmation, the system administrator is prompted at block 448 to confirm it. Assuming that the system administrator has confirmed the update, the process continues to block 451; the same point is also reached directly from the block 445 when the update is automatic. In any case, the new update policy (in the new metadata of the new virtual disk) is updated according to the delta update policy (for example, by setting the new update policy equal to the delta update policy). In this way, it is possible to preserve any customization of the update policy and/or to force its change over time.

The process continues to block 454, wherein an indication of one or more current constraints (if any) is extracted from the current metadata and an indication of one or more new constraints (if any) is extracted from the new metadata; for example, the current constraints and the new constraints may indicate license conditions that apply to the current level and to the new level, respectively, of the software product. One or more delta constraints are determined according to a comparison between the current constraints and the new constraints; for example, the delta constraints may be set equal to the new constraints that are different from the current constraints (such as additional or alternative license conditions). The flow of activity branches at block 457 according to the delta constraints. Particularly, if one or more delta constraints exist (i.e., the new constraints are different from the current constraints), the system administrator is prompted at block 460 to accept them. Assuming that the system administrator has accepted the delta constraints, the process continues to block 463; the same point is also reached directly from the block 457 when no delta constraints exist (i.e., the new constraints are the same as the current constraints, so that they have already been accepted for the current level of the software product). In this way, it is possible to ensure the compliance of the new level of the software product with any applicable constraints.

At this point, the stop command of the current level of the software product is extracted from the current metadata; the stop command is executed so as to stop the current level of the software product. Continuing to block 466, a (local) file system of the current virtual disk (i.e., the hierarchical structure of its files, starting from a local root directory) is dismounted from a corresponding mounting point within a (global) file system of the virtual machine. A (local) file system of the new virtual disk is then mounted to the same mounting point at block 469. In this way, the replacement of the current virtual disk by the new virtual disk is completely opaque to the virtual machine.

With reference to block 472, current program information (if any) of the current activation information is extracted from the current metadata. Moving to block 475, new configuration procedures (if any) of the new activation procedures are extracted from the new metadata; the new configuration procedures are then run by passing the current program information, so as to configure the new level of the software product accordingly (for example, so as to make it use the same port numbers and access the same host names/IP addresses as the current level of the software product did). In this way, it is possible to preserve any customization of the current level of the software product (ensuring the correct operation of the new level of the software product).

Considering block 478, current data information (if any) of the current activation information is extracted from the current metadata. Moving to block 481, new migration procedures (if any) of the new activation procedures are extracted from the new metadata; the new migration procedures are then run by passing the current data information, so as to migrate the data from its current format indicated in the current data information to its new format defined by the new migration procedures (for example, by changing the database schema). In this way, it is possible to convert any data of the current level of the software product for its use with the new level of the software product in a seamless way.

Moving now to block 484, the new metadata is updated according to the running of the new configuration/migration procedures. Particularly, the current program information that has been applied to the new level of the software product by the configuration procedures (i.e., excluding any program information that does not apply any longer) is copied into new program information of the new metadata. Likewise, new data information indicating the new format of the data of the new level of the software product (i.e., equal to the current format indicated in the current data information when it has not been changed or to the new format defined by the new migration procedures otherwise) is copied into the new metadata. In this way, the new metadata may be used as above for a next update of the software product.

The start command of the new level of the software product is extracted from the new metadata at block 487; the start command is executed so as to re-start the new level of the software product. The current virtual disk is detached from the virtual machine at block 490. In this way, the current level of the software product is completely replaced by its new version (for example, with a corresponding notification that is provided to the system administrator to indicate the completion of the operation).

A test then made at block 493 to verify whether the new virtual disk of the new level of a last software product has been processed. If not, the process returns to the block 427 to reiterate the same operations for the new virtual disk of the new level of a next software product. Conversely, the process returns to the block 403 waiting for a next expiry of the time-out.

In order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, ordinal or other qualifiers are merely used as labels to distinguish elements with the same name but do not by themselves connote any priority, precedence or order. Moreover, the terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), the term a/an should be intended as one or more items (unless expressly indicated otherwise), and the term means for (or any means-plus-function formulation) should be intended as any entity or structure suitable for carrying out the relevant function.

For example, an embodiment provides a method for updating at least one software product installed on a virtual machine. The method comprises the following steps. A software image is provided of at least one new virtual disk storing a new level of the software product together with new metadata; the new metadata comprises an indication of at least one new activation procedure of the new level of the software product. A current level of the software product is replaced with the new level of the software product. The current level of the software product is stored in at least one current virtual disk of the virtual machine together with current metadata; the current metadata comprises current activation information of the current level of the software product. Said step of replacing comprises the following operations. Said at least one current virtual disk is removed from the virtual machine. Said at least one new virtual disk is added to the virtual machine. Said at least one new activation procedure is run according to the current activation information.

However, the method may be applied to any type of virtual machine (for example, part of a virtual appliance or stand-alone, hosted on a hypervisor or a guest operating system), even not in a cloud computing environment. The method may be used to perform any update of the software product (for example, either to upgrade or to downgrade it). The method may be applied to any type of software products (for example, application programs, utilities, programming tools) and to any number thereof (from a single software product individually to all the software products installed on the virtual machine). The new level of the software product may be stored in any number of new virtual disks, and the software image of each new virtual disk may have any format (for example, VHD, VDI, ISO). The new metadata may have any format (for example, one or more CSV files); particularly, the new activation procedures may be in any number and of any type (see below). Similar considerations apply to the current virtual disks and the current metadata; in this case, the current activation information may be of any type (see below). In any case, the new metadata may also comprise activation information (to be used as is or as modified during the running of the activation procedures for a next update of the software product), or the current metadata may also comprise the activation procedures that were used during the previous update of the software product. The current virtual disk may be removed and the new virtual disk may be added in any way, and the new activation procedures may be run according to the current activation information in any way (see below).

In an embodiment, the current level of the software product comprises at least one further current virtual disk of the virtual machine that stores data thereof; said at least one further current virtual disk is distinct from said at least one current virtual disk.

However, the data of the current level of the software product may be stored in any number of further current virtual disks (down to none when the software product does not save any data).

In an embodiment, said step of removing said at least one current virtual disk from the virtual machine comprises dismounting a file system of said at least one current virtual disk from a mounting point of a file system of the virtual machine; said step of adding said at least one new virtual disk to the virtual machine comprises mounting a file system of said at least one new virtual disk to the mounting point of the file system of the virtual machine.

However, the current virtual disk may be removed and the new virtual disk may be added in any way (for example, by simply associating each virtual disk with a logical disk).

In an embodiment, said step of replacing the current level of the software product with the new level of the software product comprises executing a stop command indicated in the current metadata for stopping the current level of the software product before removing said at least one current virtual disk from the virtual machine, and executing a start command indicated in the new metadata for starting the new level of the software product after adding said at least one new virtual disk to the virtual machine.

However, the stop/start commands may be indicated and executed in any way (for example, by simply prompting a system administrator to stop the current level of the software product and to start the new level of the software product manually without any indication thereof in the metadata); in any case, these operations may also be omitted when the software product is not running.

In an embodiment, said step of running said at least one activation procedure comprises configuring the new level of the software product according to a configuration of the current level of the software product indicated in the current activation information.

However, the configuration of the current level of the software product may be defined by any information (for example, a user name) and the new level of the software product may be configured in any way (for example, by invoking a configuration command indicated in the new metadata). In any case, the new level of the software product may be configured by simply running the activation procedures, even without receiving any program information (for example, by collecting it directly from the current level of the software product).

In an embodiment, said step of running said at least one activation procedure comprises migrating the data stored in said at least one further virtual disk from a current format indicated in the current activation information to a new format defined by said at least one new activation procedure.

However, the current/new formats may be of any type (for example, XML schema) and the data may be migrated in any way (for example, by creating new tables, files). In any case, the data of the current level of the software product may be migrated by simply running the activation procedures, even without receiving any indication of the current format (for example, with the current format that is determined automatically, such as according to the level identifier of the current level of the software product).

More generally, the new activation procedures may be of any type (for example, quiescent scripts, command lists, executable files), and they may involve additional, different or alternative operations (for example, for configuring the new level of the software product only, for migrating the data of the current version of the software product only, for updating external software products). Likewise, the current activation information may comprise additional, different or alternative information (for example, the current program information only, the current data information only, monitoring information).

In an embodiment, said step of replacing the current level of the software product with the new level of the software product comprises storing new activation information in the new metadata according to the running of said at least one new activation procedure.

However, the new activation information may be stored in any way (for example, by either updating or not the current activation information); however, this step may also be omitted (for example, when the activation procedures only involve the migration of the data, and its new format is already indicated in the new metadata).

In an embodiment, said step of replacing the current level of the software product with the new level of the software product comprises the following operations. At least one delta constraint is determined according to a comparison between at least one new constraint of the new level of the software product indicated in the new metadata and at least one current constraint of the current level of the software product indicated in the current metadata. A confirmation is requested of a compliance with said at least one delta constraint; the replacing of the current level of the software product with the new level of the software product is conditioned on the approval of said at least one delta constraint.

However, the constraints may be of any type (for example, based on available entitlements, such as indicating a maximum number of instances of the software product that is allowed). The delta constraints may be determined in any way (for example, by leveraging a license management application). The compliance with the delta constraints may be confirmed in any way (even automatically, for example, according to the number of instances of the software product that are already installed). Any action may be taken in response to the non-compliance with the delta constraints (for example, simply providing a warning message but always allowing the update of the software product). In any case, this step may also be omitted (for example, when the verification of any constraints is performed before making available the new level of the software product, or when no constrains at all apply).

In an embodiment, said step of replacing the current level of the software product with the new level of the software product comprises the following operations. An indication is determined of a delta update policy according to a comparison between a new update policy indicated in the new metadata and a current update policy indicated in the current metadata. The replacing of the current level of the software product with the new level of the software product is controlled according to the delta update policy. The new update policy is updated according to the delta update policy.

However, the update policies may be of any type (for example, allowing the update only in a specific time frame, such as at night). The delta update policy may be determined in any way (for example, with the new update policy that takes precedence over the current update policy), and the new update policy may be updated in any way (for example, by requiring an approval of the system administrator for any change with respect to the current update policy). In any case, nothing prevents providing a global update policy that is valid for all the software products.

In an embodiment, said step of providing an image of at least one new virtual disk comprises detecting an attachment of said at least one new virtual disk to the virtual machine. In addition or in alternative, said step of providing an image of at least one new virtual disk comprises monitoring an availability of the new level of the software product in a remote product repository.

However, the attachment of the new virtual disk may be detected in any way (for example, as soon as it occurs). Likewise, the availability of the new level of the software product may be monitored in any way (for example, by accessing a web site of its vendor). In any case, the image of the new level of the software product may be provided in additional, different or alternative ways (for example, only detecting the attachment of the new virtual disk, only monitoring its availability, or downloading it automatically but requiring its attachment manually); moreover, the new level and the current level of the software product may be associated in any way (for example, with any type of product identifier, such as a URI, or simply using the product list).

Generally, similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part).

A further embodiment provides a computer program, which is configured for causing a computing system to perform the steps of the above-described method. A further aspect provides a computer program product comprising a non-transitory computer readable medium embodying a computer program, the computer program being loadable into a working memory of a computing system thereby configuring the computing system to perform the same method.

However, the computer program may be implemented as a stand-alone module, as a plug-in for a pre-existing software program (for example, the operating system), or even directly in the latter. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the relevant computer, as a stand-alone software package, partly on this computer and partly on a remote computer or entirely on the remote computer. In the latter scenario, the remote computer may be connected to the computer through any type of network, including a local area network (LAN) or a wide area network (WAN), or the connection may be made to an external computer (for example, through the Internet using an Internet Service Provider). Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A further embodiment provides a system comprising means configured for performing the steps of the same method.

However, the method may also be carried out on a system based on a different architecture (for example, a local, wide area, global, cellular or satellite network), and exploiting any type of (wired and/or wireless) connections. However, its implementation on a stand-alone computing machine is not excluded. Each computing machine may have another structure or may comprise similar elements; moreover, it is possible to replace the computing machine with any code execution entity, either based on a physical machine or a virtual machine (such as a PDA, a mobile phone, and the like), or with a combination of multiple entities (such as a multi-tier architecture, a grid computing infrastructure, and the like).

Generally, similar considerations apply if the system has a different structure or comprises equivalent components, or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

What is claimed is:

1. A method for updating at least one software product installed on a virtual machine, the method performed by one or more processors and comprising:
    providing a software image of at least one new virtual disk storing a new level of the software product together with new metadata comprising an indication of at least one new activation procedure of the new level of the software product; and
    replacing a current level of the software product with the new level of the software product, the current level of the software product being stored in at least one current virtual disk of the virtual machine together with current metadata comprising current activation information of the current level of the software product, wherein the replacing comprises:
        determining at least one delta constraint according to a comparison between at least one new constraint of the new level of the software product indicated in the new metadata and at least one current constraint of the current level of the software product indicated in the current metadata,
        requesting a confirmation of a compliance with the at least one delta constraint, the replacing of the current level of the software product with the new level of the software product being conditioned on an approval of the at least one delta constraint,
        removing the at least one current virtual disk from the virtual machine,
        adding the at least one new virtual disk to the virtual machine, and
        running the at least one new activation procedure according to the current activation information.

2. The method according to claim 1, wherein the current level of the software product comprises at least one further current virtual disk of the virtual machine storing data thereof, the at least one further current virtual disk being distinct from the at least one current virtual disk.

3. The method according to claim 1, wherein removing the at least one current virtual disk from the virtual machine comprises:
dismounting a file system of the at least one current virtual disk from a mounting point of a file system of the virtual machine; wherein adding the at least one new virtual disk to the virtual machine comprises:
mounting a file system of the at least one new virtual disk to the mounting point of the file system of the virtual machine.

4. The method according to claim 1, wherein replacing the current level of the software product with the new level of the software product comprises:
executing a stop command indicated in the current metadata for stopping the current level of the software product before removing the at least one current virtual disk from the virtual machine; and
executing a start command indicated in the new metadata for starting the new level of the software product after adding the at least one new virtual disk to the virtual machine.

5. The method according to claim 1, wherein running the at least one new activation procedure comprises:
configuring the new level of the software product according to a configuration of the current level of the software product indicated in the current activation information.

6. The method according to claim 5, wherein running the at least one activation procedure comprises:
migrating the data stored in the at least one further virtual disk from a current format indicated in the current activation information to a new format defined by the at least one new activation procedure.

7. The method according to claim 1, wherein replacing the current level of the software product with the new level of the software product comprises:
storing new activation information in the new metadata according to the running of the at least one new activation procedure.

8. The method according to claim 1, wherein replacing the current level of the software product with the new level of the software product comprises:
determining an indication of a delta update policy according to a comparison between a new update policy indicated in the new metadata and a current update policy indicated in the current metadata;
controlling the replacing of the current level of the software product with the new level of the software product according to the delta update policy; and
updating the new update policy according to the delta update policy.

9. The method according to claim 1, wherein providing an image of at least one new virtual disk comprises:
detecting an attachment of the at least one new virtual disk to the virtual machine, and monitoring an availability of the new level of the software product in a remote product repository.

10. A system for updating at least one software product installed on a virtual machine, the system comprising:
one or more computer processor circuits that are configured to:
provide a software image of at least one new virtual disk storing a new level of the software product together with new metadata comprising an indication of at least one new activation procedure of the new level of the software product; and
replace a current level of the software product with the new level of the software product, the current level of the software product being stored in at least one current virtual disk of the virtual machine together with current metadata comprising current activation information of the current level of the software product, wherein the replacing comprises:
determining at least one delta constraint according to a comparison between at least one new constraint of the new level of the software product indicated in the new metadata and at least one current constraint of the current level of the software product indicated in the current metadata;
requesting a confirmation of a compliance with the at least one delta constraint, the replacing of the current level of the software product with the new level of the software product being conditioned on an approval of the at least one delta constraint;
removing the at least one current virtual disk from the virtual machine;
adding the at least one new virtual disk to the virtual machine; and
running the at least one new activation procedure according to the current activation information.

11. The system of claim 10, wherein the current level of the software product comprises at least one further current virtual disk of the virtual machine storing data thereof, the at least one further current virtual disk being distinct from the at least one current virtual disk.

12. The system according to claim 10, wherein replace the current level of the software product with the new level of the software product comprises:
executing a stop command indicated in the current metadata for stopping the current level of the software product before removing the at least one current virtual disk from the virtual machine; and
executing a start command indicated in the new metadata for starting the new level of the software product after adding the at least one new virtual disk to the virtual machine.

13. The system according to claim 10, wherein the running the at least one new activation procedure comprises:
configuring the new level of the software product according to a configuration of the current level of the software product indicated in the current activation information.

14. The system according to claim 13, wherein running the at least one activation procedure comprises:
migrating the data stored in the at least one further virtual disk from a current format indicated in the current activation information to a new format defined by the at least one new activation procedure.

15. A computer program product comprising a computer readable storage medium having a computer readable program stored therein, wherein the computer readable program, when executed on a computing device, causes the computing device to:
provide a software image of at least one new virtual disk storing a new level of the software product together with new metadata comprising an indication of at least one new activation procedure of the new level of the software product; and
replace a current level of the software product with the new level of the software product, the current level of the software product being stored in at least one current virtual disk of the virtual machine together with current metadata comprising current activation information of the current level of the software product, wherein the replacing comprises:
- determining at least one delta constraint according to a comparison between at least one new constraint of the new level of the software product indicated in the new metadata and at least one current constraint of the current level of the software product indicated in the current metadata;
- requesting a confirmation of a compliance with the at least one delta constraint, the replacing of the current level of the software product with the new level of the software product being conditioned on an approval of the at least one delta constraint;
- removing the at least one current virtual disk from the virtual machine;
- adding the at least one new virtual disk to the virtual machine; and
- running the at least one new activation procedure according to the current activation information.

16. The computer program product according to claim 15, wherein the current level of the software product comprises at least one further current virtual disk of the virtual machine storing data thereof, the at least one further current virtual disk being distinct from the at least one current virtual disk.

17. The computer program product according to claim 15, wherein the computer readable program causes the computing device to update at least one software product installed on a virtual machine by:

- dismounting a file system of the at least one current virtual disk from a mounting point of a file system of the virtual machine; wherein the adding the at least one new virtual disk to the virtual machine comprises:
  - mounting a file system of the at least one new virtual disk to the mounting point of the file system of the virtual machine.

18. The system of claim 10, wherein the current activation information comprises port numbers used by the software product.

19. The computer program product according to claim 15, wherein the activation information comprises IP addresses of other virtual machines accessed by the software product.

20. The system of claim 10, wherein replacing the current level of the software product with the new level of the software product comprises:
- determining an indication of a delta update policy according to a comparison between a new update policy indicated in the new metadata and a current update policy indicated in the current metadata;
- controlling the replacing of the current level of the software product with the new level of the software product according to the delta update policy; and
- updating the new update policy according to the delta update policy.

* * * * *